US010677156B2

(12) United States Patent
Choi (10) Patent No.: US 10,677,156 B2
(45) Date of Patent: Jun. 9, 2020

(54) VARIABLE COMPRESSION RATIO APPARATUS

(71) Applicants: Hyundai Motor Company, Seoul (KR); Kia Motors Corporation, Seoul (KR)

(72) Inventor: Myungsik Choi, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 21 days.

(21) Appl. No.: 16/205,972

(22) Filed: Nov. 30, 2018

(65) Prior Publication Data

US 2020/0040816 A1 Feb. 6, 2020

(30) Foreign Application Priority Data

Aug. 3, 2018 (KR) .................. 10-2018-0090953

(51) Int. Cl.
*F02B 75/04* (2006.01)
*F16C 3/28* (2006.01)
*F02D 15/02* (2006.01)

(52) U.S. Cl.
CPC .......... *F02B 75/047* (2013.01); *F02B 75/048* (2013.01); *F02D 15/02* (2013.01); *F16C 3/28* (2013.01)

(58) Field of Classification Search
CPC ...... F02B 75/045; F02B 75/048; F02B 75/04; F02B 75/044; F02D 15/02; F16C 7/06; F16C 9/04; F16C 7/023; F01L 1/3442; F16J 1/16

See application file for complete search history.

(56) References Cited

U.S. PATENT DOCUMENTS 2,427,668 A * 9/1947 Gill ...................... F02B 75/045
123/48 B
4,721,073 A * 1/1988 Naruoka ................. F02B 41/04
123/78 BA (Continued)

FOREIGN PATENT DOCUMENTS

JP         2913721 B2 *  6/1999
KR      10-1338461     12/2013
KR      101459426 B1 * 11/2014

*Primary Examiner* — George C Jin
*Assistant Examiner* — Teuta B Holbrook
(74) *Attorney, Agent, or Firm* — Morgan, Lewis & Bockius LLP (57) ABSTRACT

A VCR apparatus may include a connecting rod at which a small end forming a hole having a circular shape to be rotatably connected with a piston pin moving together with the piston and a large end rotatably connected with a crank pin eccentrically arranged with respect to the crankshaft are formed; an eccentric cam concentrically arranged and rotatably disposed in the hole of the small end and configured so that the piston pin is eccentrically inserted thereinto and is rotatably connected therewith; a latching pin disposed in the small end to make a reciprocal rectilinear motion in a direction of rotation axis of the small end and operated to selectively latch the small end with the eccentric cam in one among at least two relative positions between the small end and the eccentric cam; and an acting oil passage formed at the connecting rod.

13 Claims, 10 Drawing Sheets

(56) References Cited

U.S. PATENT DOCUMENTS

| | | | | |
|---|---|---|---|---|
| 4,864,975 | A | * | 9/1989 | Hasegawa ............. F02B 75/045 |
| | | | | 123/48 B |
| 4,934,347 | A | * | 6/1990 | Suga .................... F02B 75/044 |
| | | | | 123/48 B |
| 5,178,103 | A | * | 1/1993 | Simko .................. F02B 75/044 |
| | | | | 123/48 B |
| 10,247,093 | B2 | * | 4/2019 | Miller ................... F02B 75/045 |
| 2003/0233989 | A1 | * | 12/2003 | Papaioannou .......... F02B 75/04 |
| | | | | 123/48 R |
| 2009/0107467 | A1 | * | 4/2009 | Berger ................... F02D 15/04 |
| | | | | 123/48 B |
| 2011/0061631 | A1 | * | 3/2011 | Daouk ................. F02B 75/045 |
| | | | | 123/48 R |
| 2011/0079200 | A1 | * | 4/2011 | Lee ...................... F02B 75/044 |
| | | | | 123/48 B |
| 2012/0000444 | A1 | | 1/2012 | Yang et al. |
| 2012/0012090 | A1 | * | 1/2012 | Lee ...................... F02B 75/044 |
| | | | | 123/78 BA |
| 2018/0087455 | A1 | * | 3/2018 | Kim ....................... F02B 75/04 |
| 2018/0142615 | A1 | * | 5/2018 | Choi ...................... F15B 15/12 |

* cited by examiner

VARIABLE COMPRESSION RATIO APPARATUS

CROSS-REFERENCE TO RELATED APPLICATION

The present application claims priority to Korean Patent Application No. 10-2018-0090953 filed on Aug. 3, 2018, the entire contents of which is incorporated herein for all purposes by this reference.

BACKGROUND OF THE INVENTION

Field of the Invention

The present invention relates to a variable compression ratio apparatus, and more particularly, to a variable compression ratio apparatus in which a compression ratio of a mixture in a combustion chamber is varied according to an operational state of an engine.

Description of Related Art

Generally, heat efficiency of a heat engine is increased when a compression ratio is high, and in a case of a spark ignition engine, when an ignition time is advanced to a certain level, heat efficiency is increased. But, when an ignition time of a spark ignition engine is advanced at a high compression ratio, abnormal combustion occurs to damage the engine, so there is a limitation in advancing an ignition time and a corresponding degradation of an output may be tolerated.

A variable compression ratio (VCR) apparatus is an apparatus configured for changing a compression ratio of a mixture according to an operational state of an engine. According to the VCR apparatus, a compression ratio of a mixture is increased in a low load condition to enhance mileage (or fuel efficiency), and the compression ratio of the mixture is lowered in a high load condition to prevent a generation of knocking and enhance an engine output.

The related art VCR apparatus implements a change in a compression ratio by changing a length of a connecting rod connecting a piston and a crankshaft. In the VCR apparatus, the portion connecting the piston and the crack shaft may include several links, directly transmitting combustion pressure to the links. Thus, durability of the links weakens.

Various experimentation results with respect to the related art VCR apparatus revealed that operation reliability is high when a distance between the rank pin and the piston pin is changed by use of an eccentric cam. Meanwhile, when hydraulic pressure is used to rotate an eccentric cam, an amount of rotation and an amount of hydraulic outflow of the eccentric cam of each cylinder are different, result in problems in that a compression ratio of each cylinder is not uniform and a time during which a compression ratio is changed varies according to engine operational conditions. Furthermore, a control for latching an eccentric cam may not be easy.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a variable compression ratio apparatus having advantages of changing a compression ratio of a mixture by mounting an eccentric cam in a small end portion of a connecting rod and selectively latching the eccentric cam in positions where are different from each other.

Furthermore, various aspects of the present invention are directed to providing compression ratio apparatus having further advantages of preventing Interference by rotational inertia when latching the eccentric cam and reducing cost as a latching pin having a simple composition to be moved in a direction which is disposed in parallel with a crankshaft is provided.

The variable compression ratio apparatus according to an exemplary embodiment of the present invention may be a variable compression ratio (VCR) apparatus which is disposed in an engine rotating a crankshaft upon receiving combustion power of a mixture from a piston and is configured to change a compression ratio of the mixture according to a driving condition of the engine.

The VCR apparatus may include: a connecting rod at which a small end portion forming a hole having a circular shape to be rotatably connected to a piston pin moving together with the piston and a large end portion rotatably connected to a crank pin eccentrically disposed with respect to the crankshaft are formed; an eccentric cam concentrically disposed and rotatably disposed in the hole of the small end portion and configured so that the piston pin is eccentrically inserted thereinto and is rotatably connected therewith; a latching pin disposed in the small end portion to make a reciprocal rectilinear motion in a direction of rotation axis of the small end portion and operated to selectively latch the small end portion with the eccentric cam in one among at least two relative positions between the small end portion and the eccentric cam; and an acting oil passage formed at the connecting rod such that hydraulic pressure for operating the latching pin is supplied from the large end portion to the latching pin.

The VCR apparatus may further include: a first hollow protrusion portion protruded toward an external side from one side of the connecting rod such that a portion thereof is overlapped with one opened surface of the hole of the small end portion in which the eccentric cam is inserted and accommodated and configured to have a hollow which is bored in parallel with a direction of rotation axis of the eccentric cam; a second hollow protrusion portion protruded toward an external side from the other side of the connecting rod such that a portion thereof is overlapped with the other opened surface of the hole of the small end portion in which the eccentric cam is inserted and accommodated and configured to have a hollow which is bored in parallel with a direction of rotation axis of the eccentric cam; and a hollow connecter portion formed at the connecting rod to be disposed at an internal side with respect to the one opened surface and the other opened surface of the small end portion for communicating the hollow of the first hollow protrusion portion with the hollow of the second hollow protrusion portion.

The hole of the small end portion may be partially overlapped with the hollow of the first hollow protrusion portion and the hollow of the second hollow protrusion portion.

The acting oil passages may include: a first oil passage extending from the large end portion to the first hollow protrusion portion in a longitudinal direction of the connecting rod to receive hydraulic pressure transferred through the crankshaft; a first horizontal extending passage extending toward an external side in parallel with a direction of rotation axis of the small end portion from an extended end portion of the first oil passage; a first vertical extending passage vertically extending with a direction of rotation axis of the small end portion from an extended end portion of the first horizontal extending passage to communicate with the hollow of the first hollow protrusion portion; a second oil passage extending from the large end portion to the second hollow protrusion portion in a longitudinal direction of the connecting rod to receive hydraulic pressure transferred through the crankshaft; a second horizontal extending passage extending toward an external side in parallel with a direction of rotation axis of the small end portion from an extended end portion of the second oil passage; and a second vertical extending passage vertically extending with a direction of rotation axis of the small end portion from an extended end portion of the second horizontal extending passage to communicate with the hollow of the second hollow protrusion portion.

The latching pin may include: a first land formed at one end portion of the latching pin in a direction of making a rectilinear motion and disposed in the hollow of the first hollow protrusion portion; a second land formed at the other end portion of the latching pin in a direction of making a rectilinear motion and disposed in the hollow of the second hollow protrusion portion; and a spool shaft formed to be thinner than the first land and the second land and configured to connect the first land and the second land.

The hollow of the first hollow protrusion portion may be formed to be longer than the first land in a direction of making a rectilinear motion of the latching pin and to have a size to correspond with the first land in a direction which is vertically disposed with a direction of making a rectilinear motion of the latching pin and be configured to have a first chamber which communicates with the first vertical extending passage at an external side with respect to an external surface of the first land, and the hollow of the second hollow protrusion portion may be formed to be longer than the second land in a direction of making a rectilinear motion of the latching pin and to have a size to correspond with the second land in a direction which is vertically disposed with a direction of making a rectilinear motion of the latching pin and be configured to have a second chamber which communicates with the second vertical extending passage at an external side with respect to an external surface of the second land.

A force for moving the first land toward the eccentric cam may be generated as hydraulic pressure flowed in the first chamber pushes an external surface of the first land in case that hydraulic pressure sequentially passing through the first oil passage, the first horizontal extending passage, and the first vertical extending passage is supplied to the first chamber.

When a first latching groove recessed from one surface of the eccentric cam is positioned to be corresponded with the first chamber depending on rotation of the eccentric cam in a state of maintaining the force of pushing the first land toward the eccentric cam, the latching pin may be moved such that the first land is inserted into the first latching groove.

A low compression ratio condition of the engine may be achieved as the top dead center of the piston is to be relatively low when the first land is inserted into the first latching groove such that the small end portion is latched with the eccentric cam.

Operation of returning the latching pin into a state that the small end portion is not latched to the eccentric cam may be performed as hydraulic pressure flowed in the second chamber pushes an external surface of the second land in a state that the first land is inserted into the first latching groove.

The first latching groove may be formed in a partial circular shape including a circular arc and the first land may be inserted as a partial circle including a circular arc.

A force for moving the second land toward the eccentric cam may be generated as hydraulic pressure flowed in the second chamber pushes an external surface of the second land in case that hydraulic pressure sequentially passing through the second oil passage, the second horizontal extending passage, and the second vertical extending passage is supplied to the second chamber.

When a second latching groove recessed from one surface of the eccentric cam is positioned to be corresponded with the second chamber depending on rotation of the eccentric cam in a state of maintaining the force of pushing the second land toward the eccentric cam, the latching pin may be moved such that the second land is inserted into the second latching groove.

A high compression ratio condition of the engine may be achieved as the top dead center of the piston is to be relatively high when the second land is inserted into the second latching groove such that the small end portion is latched with the eccentric cam.

Operation of returning the latching pin into a state that the small end portion is not latched to the eccentric cam may be performed as hydraulic pressure flowed in the first chamber pushes an external surface of the first land in a state that the second land is inserted into the second latching groove.

The second latching groove may be formed in a partial circular shape including a circular arc and the second land may be inserted as a partial circle including a circular arc.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

An exemplary embodiment of the present invention will hereinafter be described in detail with reference to the accompanying drawings.

Figure 1:
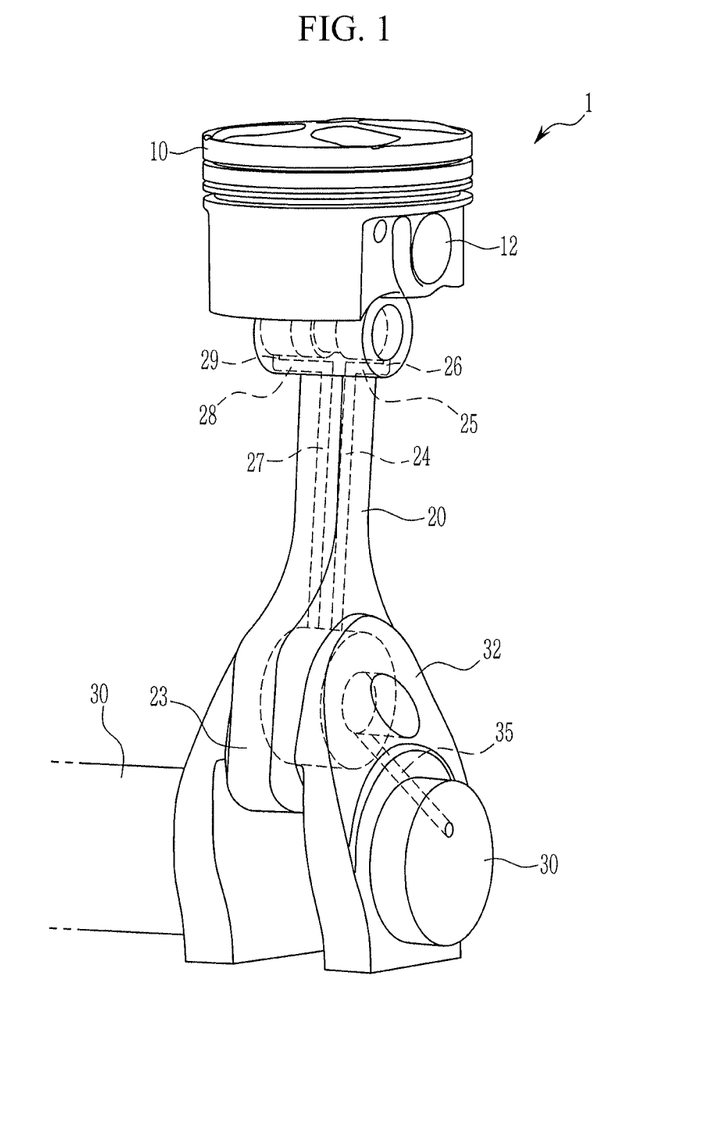
FIG. 1 is a perspective view of a variable compression ratio apparatus according to an exemplary embodiment of the present invention.
Figure 2:
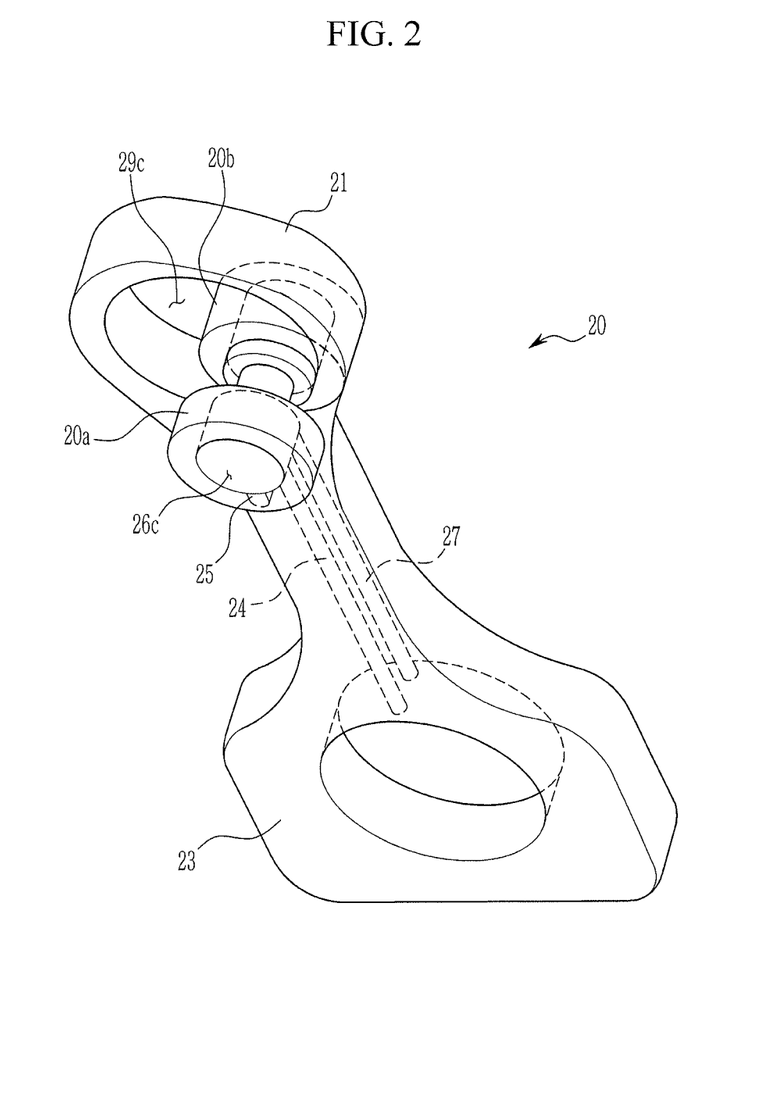
FIG. 2 is a perspective view of a connecting rod according to an exemplary embodiment of the present invention.
Figure 3:
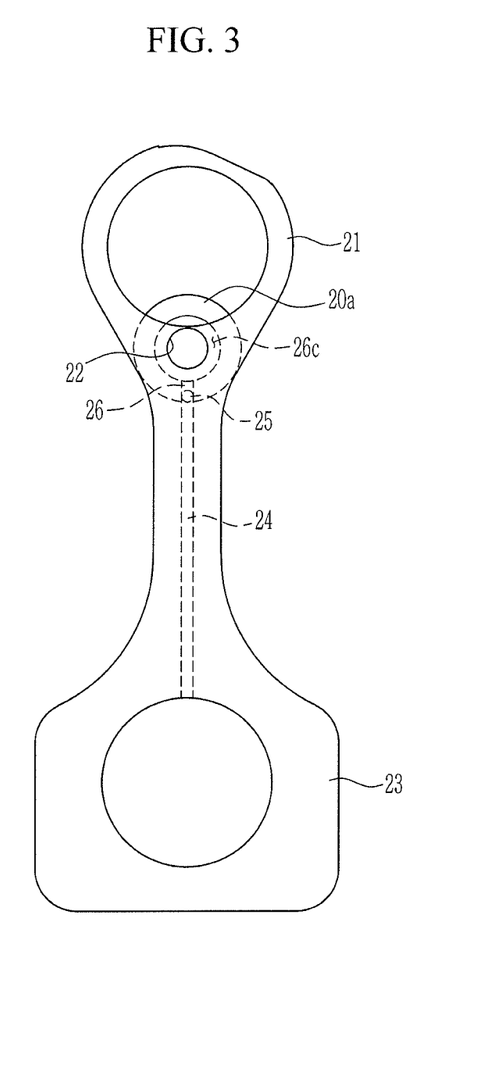
FIG. 3 is a cross-sectional view of a connecting rod according to an exemplary embodiment of the present invention.
Figure 4:
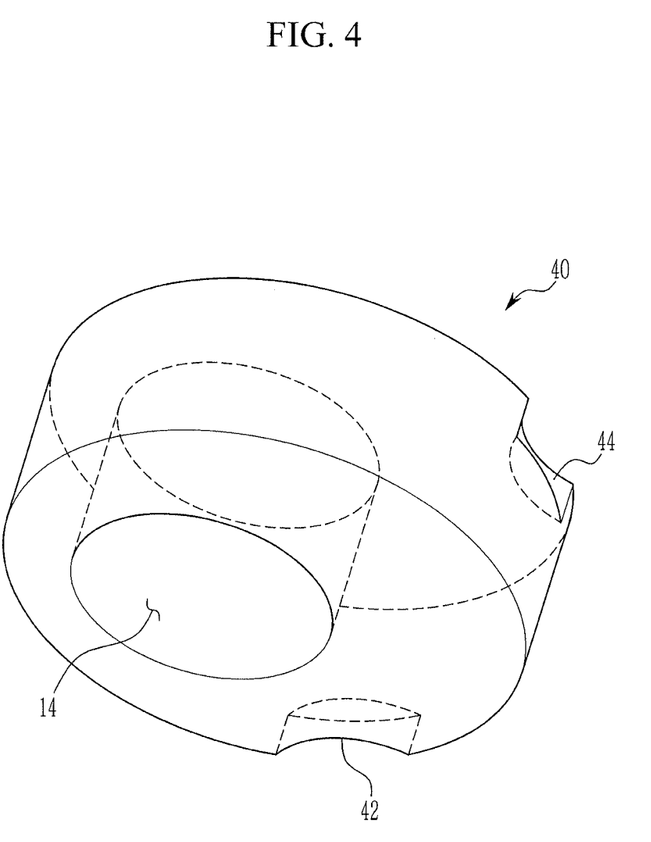
FIG. 4 is a perspective view of an eccentric cam according to an exemplary embodiment of the present invention.
Figure 5:
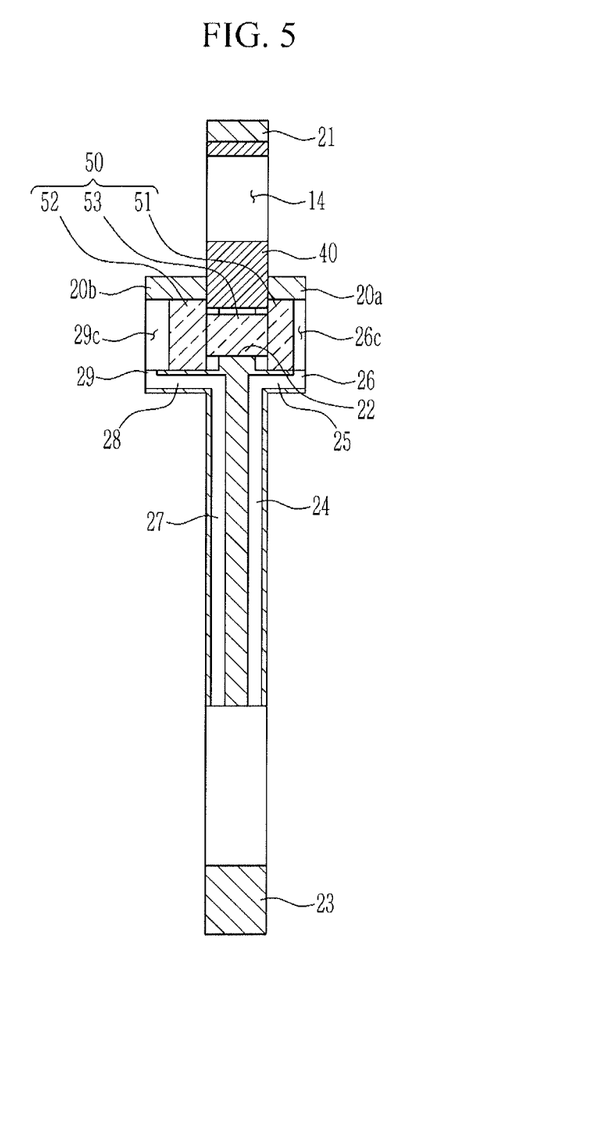
FIG. 5 is a cross-sectional view of a variable compression ratio apparatus according to an exemplary embodiment of the present invention.

FIG. 1 is a perspective view of a variable compression ratio apparatus according to an exemplary embodiment of the present invention, FIG. 2 is a perspective view of a connecting rod according to an exemplary embodiment of the present invention, FIG. 3 is a cross-sectional view of a connecting rod according to an exemplary embodiment of the present invention, FIG. 4 is a perspective view of an eccentric cam according to an exemplary embodiment of the present invention, and FIG. 5 is a cross-sectional view of a variable compression ratio apparatus according to an exemplary embodiment of the present invention.

FIG. 1, FIG. 2, FIG. 3, FIG. 4, and FIG. 5 illustrate a portion of an engine for showing a composition of a variable compression ratio apparatus 1 according to an exemplary embodiment of the present invention.

As shown in FIG. 1, FIG. 2, FIG. 3, FIG. 4, and FIG. 5, a variable compression ratio apparatus 1 according to an exemplary embodiment of the present invention is provided to an engine rotating a crankshaft 30 upon receiving combustion power of a mixture from a piston 10 to change a compression ratio of the mixture according to driving conditions of the engine.

The piston 10 makes a vertical movement within a cylinder, and a combustion chamber is formed between the piston 10 and the cylinder. Furthermore, the crankshaft 30 receives combustion power from the piston 10, converts the combustion power into rotational force, and transfers the rotational force to a transmission. The crankshaft 30 is disposed in a crank case formed in a lower end portion of the cylinder. Also, a plurality of balance weights 32 are coupled or formed in the crankshaft 30 to reduce vibrations generated by rotation thereof. The basic composition and function of an engine are well known to a person of an ordinary skill in the art.

The variable compression ratio apparatus 1 according to an exemplary embodiment of the present invention includes a connecting rod 20, an eccentric cam 40, and acting oil passages 24, 25, 26, 27, 28, and 29.

The connecting rod 20 receives the combustion force from the piston 10 to transmit the received combustion force to the crankshaft 30. To transmit the combustion force, one end portion of the connecting rod 20 is rotatably connected to the piston 10 by a piston pin 12 and the other end portion of the connecting rod 20 is rotatably connected to the crankshaft 30 and the balance weight 32 by a crank pin 34 which is eccentrically disposed with respect to the crankshaft 30. In general, the one end portion of the connecting rod 20 connected to the piston 10 is referred to as a small end portion 21, and the other end portion of the connecting rod 20 connected to the crankshaft 30 to have a radius of gyration to be larger than a small end portion 21 is referred to as a large end portion 23. Furthermore, a hole bored to a direction of rotation axis is formed at the small end portion 21. The hole of the small end portion 21 is formed in a circular shape such that the small end portion 21 is rotatably connected to the piston pin 12. Herein, it is well-known to a person of an ordinary skill in the art that the piston pin 12 makes a vertical movement with together with the piston 10, and in the present specification, a piston pin insertion hole 14 in which the piston pin 12 is inserted and positioned and the piston pin 12 will be represented as a same reference numeral. In this regard, an entire shape of the connecting rod 20 of the variable compression ratio apparatus 1 according to an exemplary embodiment of the present invention is similar to an ordinary connecting rod, and shapes of the small end portion 21 and the large end portion 23 which are configured so that the piston pin 12 and the crank pin 34 are respectively connected to the connecting rod 20 may be equal to an ordinary connecting rod. Therefore, it is possible that a change of design is minimized in an ordinary engine even though the variable compression ratio apparatus is disposed therein.

The eccentric cam 40 is disposed at the small end portion 21 of the connecting rod 20 to be rotatably inserted into the hole of the small end portion 21. Furthermore, the eccentric cam 40 is formed in a circular shape having an external diameter which is corresponded with an internal diameter of the hole of the small end portion 21, and is concentrically inserted into the hole of the small end portion 21. Furthermore, the piston pin insertion hole 12, into which the piston pin 12 is inserted, is eccentrically formed at the eccentric cam 40. That is, the piston 10 is rotatably connected to the eccentric cam 40 as the piston pin 12 is inserted into the piston pin insertion holes 12 formed at the piston 10 and the eccentric cam 40. Thus, the eccentric cam 40 rotates around a circle center thereof and simultaneously, rotates around an axial center C2 of the piston pin 12 which is disposed apart from the circle center of the eccentric cam 40. Herein, as the piston pin 12 is eccentrically inserted into the eccentric cam 40, relative positions between the axial center C2 of the piston pin 12 and a center of the hole of the small end portion 21 are changed depending on rotation of the eccentric cam 40 in the hole of the small end portion 21. In other words, as the eccentric cam 40 rotates in the hole of the small end portion 21 such that a relative position of the piston 10 for the small end portion 21 of the connecting rod 20 is changed, a compression ratio of the mixture is changed.

The acting oil passages 24, 25, 26, 27, 28, and 29 are formed at the connecting rod 20, supplying hydraulic pressure for selectively latching the eccentric cam 40 to the small end portion 21 of the connecting rod 20. In this regard, the eccentric cam 40 is selectively latched to the small end portion 21 in one among at least two relative positions between the piston 10 and the connecting rod 20 small end portion 21 differently required depending on a driving condition of an engine. Furthermore, the acting oil passages 24, 25, 26, 27, 28, and 29 is formed to receive hydraulic pressure from oil passages 35 which are formed at the crankshaft 30, the balance weight 32, and the crank pin 34. Herein, the oil passages 35 formed at the crankshaft 30, the balance weight 32 and the crank pin 34 and supply of hydraulic pressure therethrough are well-known to a person of an ordinary skill in the art, so detailed descriptions thereof will be omitted.

FIG. 6, FIG. 7, FIG. 8, and FIG. 9 are operational views of a variable compression ratio apparatus according to an exemplary embodiment of the present invention.

As shown in FIG. 5, FIG. 6, FIG. 7, FIG. 8, and FIG. 9, the variable compression ratio apparatus 1 according to an exemplary embodiment of the present invention further includes a first hollow protrusion portion 20a, a second hollow protrusion portion 20b, a hollow connecter portion 22, and a latching pin 50, and the acting oil passages 24, 25, 26, 27, 28, and 29 include a first oil passage 24, a first horizontal extending passage 25, a first vertical extending passage 26, a second oil passage 27, a second horizontal extending passage 28, and a second vertical extending passage 29.

The first hollow protrusion portion 20a protrudes toward an external side from one side of the connecting rod 20 such that a portion thereof is overlapped with one opened surface of the hole of the small end portion 21 in which the eccentric cam 40 is inserted and accommodated. For convenience of description, a direction of being estranged form a center of the connecting rod 20 in a direction of rotation axis of the eccentric cam 40 will be defined to "external side", and a direction of approaching the center of the connecting rod 20 in a direction of rotation axis of the eccentric cam 40 will be defined to "internal side". Furthermore, the first hollow protrusion portion 20a has a hollow which is bored in parallel with a direction of rotation axis of the eccentric cam 40. For instance, the first hollow protrusion portion 20a may be formed in a hollow cylindrical shape. Furthermore, the hole of the small end portion 21 in which the eccentric cam 40 is inserted and accommodated and the hollow of the first hollow protrusion portion 20a are partially overlapped.

The second hollow protrusion portion 20b protrudes toward an external side from the other side of the connecting rod 20 such that a portion thereof is overlapped with the other opened surface of the hole of the small end portion 21 in which the eccentric cam 40 is inserted and accommodated. Furthermore, the second hollow protrusion portion 20b has a hollow which is bored in parallel with a direction of rotation axis of the eccentric cam 40. For instance, the second hollow protrusion portion 20b may be formed in a hollow cylindrical shape which is concentrically disposed with the first hollow protrusion portion 20a. Furthermore, the hollow of the second hollow protrusion portion 20b is partially overlapped with the hole of the small end portion 21 in which the eccentric cam 40 is inserted and accommodated.

The hollow connecter portion 22 is formed at the connecting rod 20 to communicate the hollow of the first hollow protrusion portion 20a with the hollow of the second hollow protrusion portion 20b. Furthermore, the hollow connecter portion 22 is formed at an internal side with respect to the one opened surface and the other opened surface of the hole of the small end portion 21. Furthermore, as a hole bored to the hollow connecter portion 22 for communicating the hollow of the first hollow protrusion portion 20a and the hollow of the second hollow protrusion portion 20b is formed to have a cross section which is smaller than the hollow of the first hollow protrusion portion 20a and the hollow of the second hollow protrusion portion 20b, a step is formed at the hollow connecter portion 22.

The first oil passage 24 is formed in a longitudinal direction of the connecting rod 20. Furthermore, the first oil passage 24 extends from the large end portion 23 to the first hollow protrusion portion 20a to achieve latching the eccentric cam 40 with the small end portion 21 by use of hydraulic pressure supplied from the oil passages 35 formed at the crankshaft 30, the balance weight 32, and the crank pin 34. Meanwhile, hydraulic pressure used for latching the eccentric cam 40 with the small end portion 21 is of course drained via the oil passages 35 formed at the crankshaft 30, the balance weight 32, and the crank pin 34 and the first oil passage 24. Furthermore, the first oil passage 24 is disposed to be relatively close to the first hollow protrusion portion 20a.

The first horizontal extending passage 25 communicates with the first oil passage 24 and extends toward an external side in parallel with a direction of rotation axis of the small end portion 21 from an end portion of the first oil passage 24 which extends from the large end portion 23.

The first vertical extending passage 26 communicates with the first horizontal extending passage 25 and is vertically extending with a direction of rotation axis of the small end portion 21 from an end portion of the first horizontal extending passage 25, which extends from the first oil passage 24, to be communicated to the hollow of the first hollow protrusion portion 20a.

The second oil passage 27 is formed in a longitudinal direction of the connecting rod 20. Furthermore, the second oil passage 27 extends from the large end portion 23 to the second hollow protrusion portion 20b to achieve latching the eccentric cam 40 with the small end portion 21 by use of hydraulic pressure supplied from the oil passages 35 formed at the crankshaft 30, the balance weight 32, and the crank pin 34. That is, the second oil passage 27 is formed in parallel with the first oil passage 24. Meanwhile, hydraulic pressure used for latching the eccentric cam 40 with the small end portion 21 is of course drained via the oil passages 35 formed at the crankshaft 30, the balance weight 32, and the crank pin 34 and the second oil passage 27, and in this regard, hydraulic pressure has been supplied through the first oil passage 24 may be drained through the second oil passage 27 and hydraulic pressure has been supplied through the second oil passage 27 may be drained through the first oil passage 24. Furthermore, the second oil passage 27 is disposed to be relatively close to the second hollow protrusion portion 20b.

The second horizontal extending passage 28 communicates with the second oil passage 27 and extends toward an external side in parallel with a direction of rotation axis of the small end portion 21 from an end portion of the second oil passage 27 which extends from the large end portion 23.

The second vertical extending passage 29 communicates with the second horizontal extending passage 28 and is vertically extending with a direction of rotation axis of the small end portion 21 from an end portion of the second horizontal extending passage 28, which extends from the second oil passage 27, to be communicated to the hollow of the second hollow protrusion portion 20b.

The latching pin 50 is disposed in the hollow of first hollow protrusion portion 20a, the hollow of the second hollow protrusion portion 20b, and the hole of the hollow connecter portion 22 which are communicating with each other. Furthermore, the latching pin 50 is disposed to make a reciprocal rectilinear motion in a direction which is disposed in parallel with a direction of rotation axis of the eccentric cam 40. Herein, the latching pin 50 is moved toward one direction by hydraulic pressure supplied through the first oil passage 24 and is moved toward an opposite direction by hydraulic pressure supplied through the second oil passage 27, realizing a reciprocal rectilinear motion of the latching pin 50. Furthermore, the eccentric cam 40 is selectively latched with the small end portion 21 as the latching pin 50 is moved by hydraulic pressure.

The variable compression ratio apparatus 1 according to an exemplary embodiment of the present invention is configured so that the latching pin 50 forms a first land 51, a second land 52, and spool shaft 53, the hollow of the first hollow protrusion portion 20a forms a first chamber 26c, and the hollow of the second hollow protrusion portion 20b forms a second chamber 29c.

The first land 51 is formed at one end portion of the latching pin 50 in a direction of making a rectilinear motion and is disposed in the hollow of the first hollow protrusion portion 20a. Furthermore, an internal surface of the first land 51 and the one opened surface of the hole of the small end portion 21 are disposed on a same plane in a state that the eccentric cam 40 is not latched with the small end portion 21.

The second land 52 is formed at the other end portion of the latching pin 50 in a direction of making a rectilinear motion and is disposed in the hollow of the second hollow protrusion portion 20b. Furthermore, an internal surface of the second land 52 and the other opened surface of the hole of the small end portion 21 are disposed on a same plane in a state that the eccentric cam 40 is not latched with the small end portion 21.

The spool shaft 53 is formed to be thinner than the first land 51 and the second land 52 and is configured to connect the first land 51 and the second land 52. For instance, if an entire shape of the latching pin 50 is a cylindrical shape, diameters of the first land 51 and the second land 52 are equal and a diameter of the spool shaft 53 is smaller than diameters of the first land 51 and the second land 52. Furthermore, the spool shaft 53 is disposed in the hole of the hollow connecter portion 22. Furthermore, in a direction of making a rectilinear motion of the latching pin 50, a length of the spool shaft 53 is equal to a length of the eccentric cam 40 in a direction of rotation axis and is longer than a length of the hollow connecter portion 22.

The first chamber 26c is a space which communicates with the first vertical extending passage 26. Furthermore, the first chamber 26c is a portion of the hollow of the first hollow protrusion portion 20a which is formed at an external side with respect to an external surface of the first land 51. That is, the hollow of the first hollow protrusion portion 20a is formed to be longer than the first land 51 in a direction of making a rectilinear motion of the latching pin 50 and is configured to have a size to correspond with the first land 51 in a direction which is vertically disposed with a direction of making a rectilinear motion of the latching pin 50. In other words, if an entire shape of the latching pin 50 is a cylindrical shape, an internal diameter of the first chamber 26c corresponds with an external diameter of the first land 51. Meanwhile, it may be realized depending on a design of a person of an ordinary skill in the art that an external side of the first chamber 26c is closed, generating hydraulic pressure in the first chamber 26c.

The second chamber 29c is a space which communicates with the second vertical extending passage 29. Furthermore, the second chamber 29c is a portion of the hollow of the second hollow protrusion portion 20b which is firmed at an external side with respect to an external surface of the second land 52. That is, the hollow of the second hollow protrusion portion 20b is formed to be longer than the second land 52 in a direction of making a rectilinear motion of the latching pin 50 and is configured to have a size to correspond with the second land 52 in a direction which is vertically disposed with a direction of making a rectilinear motion of the latching pin 50. In other words, if an entire shape of the latching pin 50 is a cylindrical shape, an internal diameter of the second chamber 29c corresponds with an external diameter of the second land 52. Meanwhile, it may be realized depending on a design of a person of an ordinary skill in the art that an external side of the second chamber 29c is closed for generating hydraulic pressure in the second chamber 29c.

The hole of the hollow connecter portion 22 has a size corresponding with the spool shaft 53 in a direction which is vertically disposed with a direction of making a rectilinear motion of the latching pin 50. In other words, if an entire shape of the latching pin 50 is a cylindrical shape, an internal diameter of the first chamber 26c is equal to an internal diameter of the second chamber 29c and an internal diameter of the hole of the hollow connecter portion 22 is shorter than internal diameters of the first chamber 26c and the second chamber 29c and is corresponded with an external diameter of the spool shaft 53. Therefore, the first land 51 or the second land 52 functions as a stopper for preventing an excessive motion of the latching pin 50 by being blocked to the step of the hollow connecter portion 22 when the latching pin 50 makes a rectilinear motion.

Hereinafter, operation of the variable compression ratio apparatus 1 according to an exemplary embodiment of the present invention will be described referring to FIG. 6, FIG. 7, FIG. 8, and FIG. 9.

Figure 6:
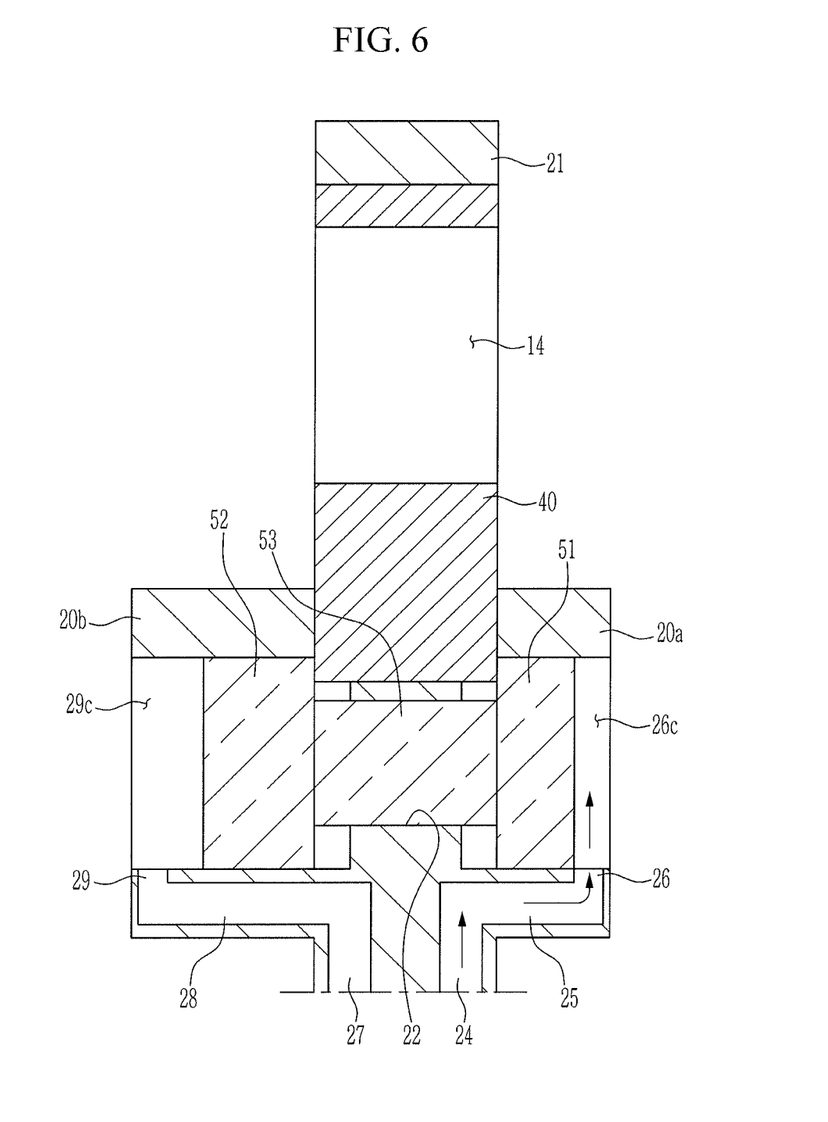
FIG. 6, FIG. 7, FIG. 8, and FIG. 9 are operational views of a variable compression ratio apparatus according to an exemplary embodiment of the present invention.

As shown in FIG. 6, in the variable compression ratio apparatus 1 according to an exemplary embodiment of the present invention, a force for moving the latching pin 50 toward the second chamber 29c as hydraulic pressure flowed in the first chamber 26c pushes an external surface of the first land 51, that is, the force of pushing the first land 51 toward the eccentric cam 40 is generated in case that hydraulic pressure sequentially passing through the first oil passage 24, the first horizontal extending passage 25, and the first vertical extending passage 26 is supplied to the first chamber 26c.

Figure 7:
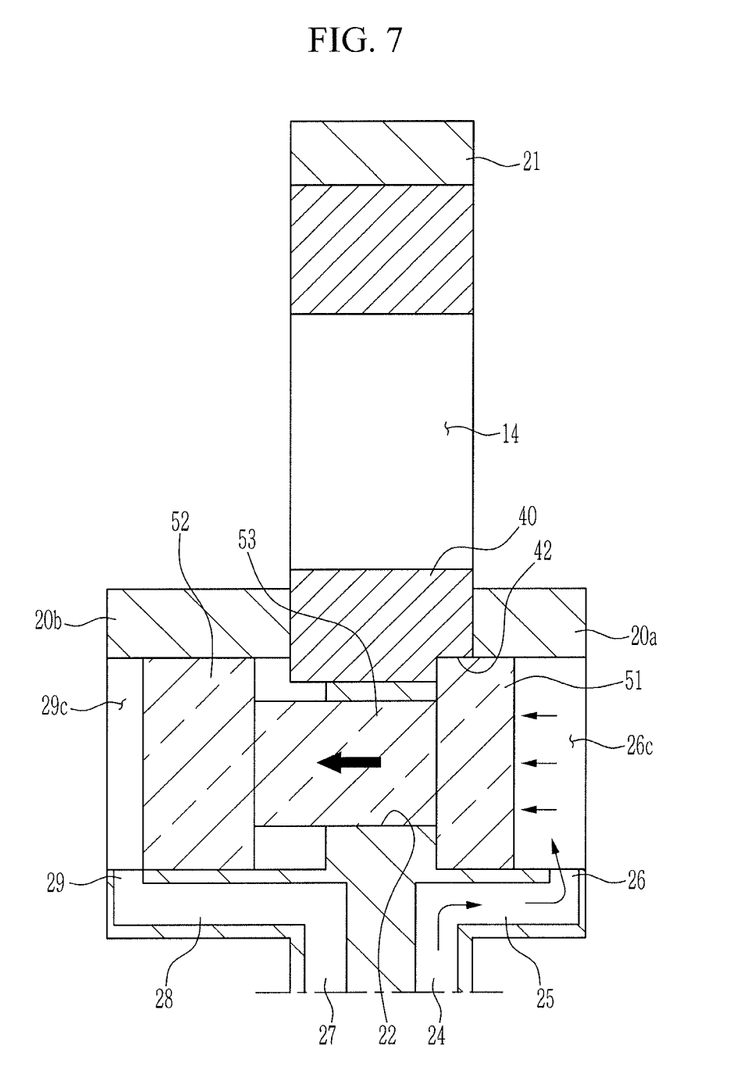

As shown in FIG. 7, the latching pin 50 is moved such that the first land 51 is inserted into a first latching groove 42 when the first latching groove 42 recessed from one surface of the eccentric cam 40 is positioned to be corresponded with a portion of the first land 51 depending on rotation of the eccentric cam 40 in a state that the force of pushing the first land 51 toward the eccentric cam 40 is maintained (Referring to FIG. 4). Herein, the first latching groove 42 may be formed in a shape corresponding with parts of the first chamber 26c and the first land 51. For instance, if the first chamber 26c and the first land 51 are formed in a circular shape, the first latching groove 42 is formed in a partial circular shape including a circular arc and the first land 51 is inserted as a partial circle including a circular arc. In this regard, the small end portion 21 is latched to the eccentric cam 40 when the first land 51 is moved to be inserted into the first latching groove 42.

Figure 8:
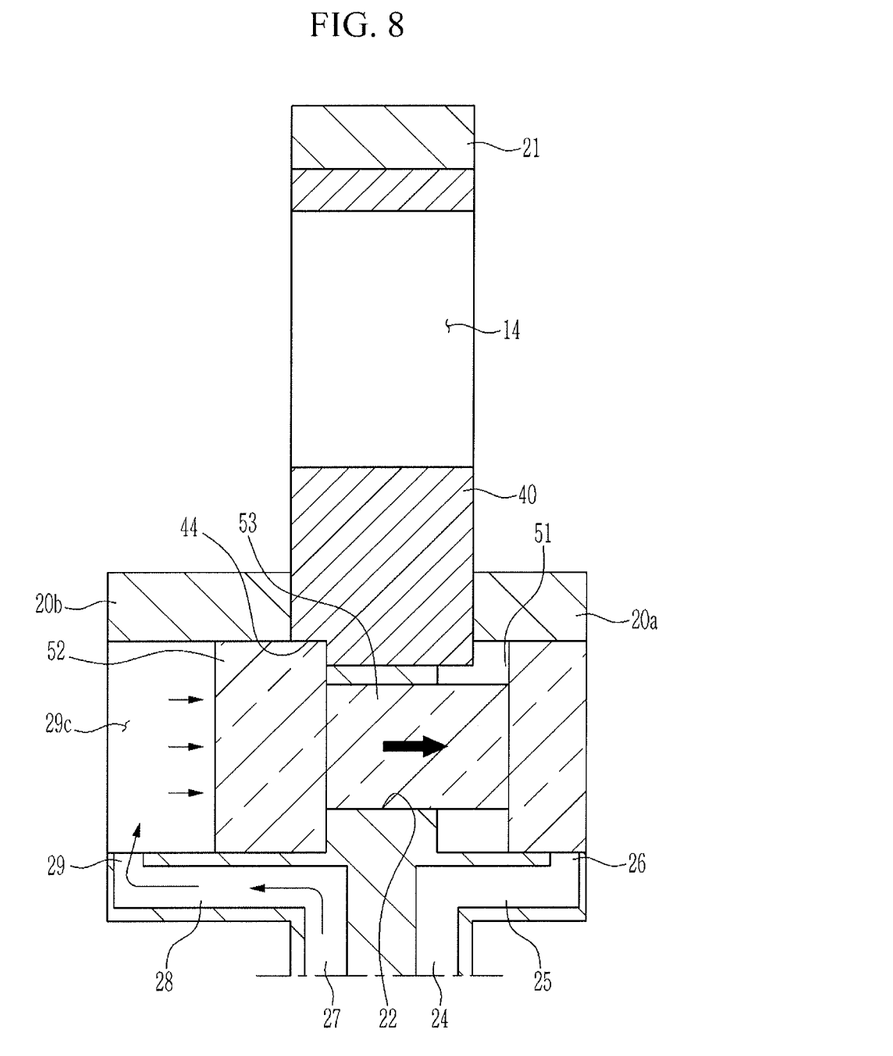
Figure 9:
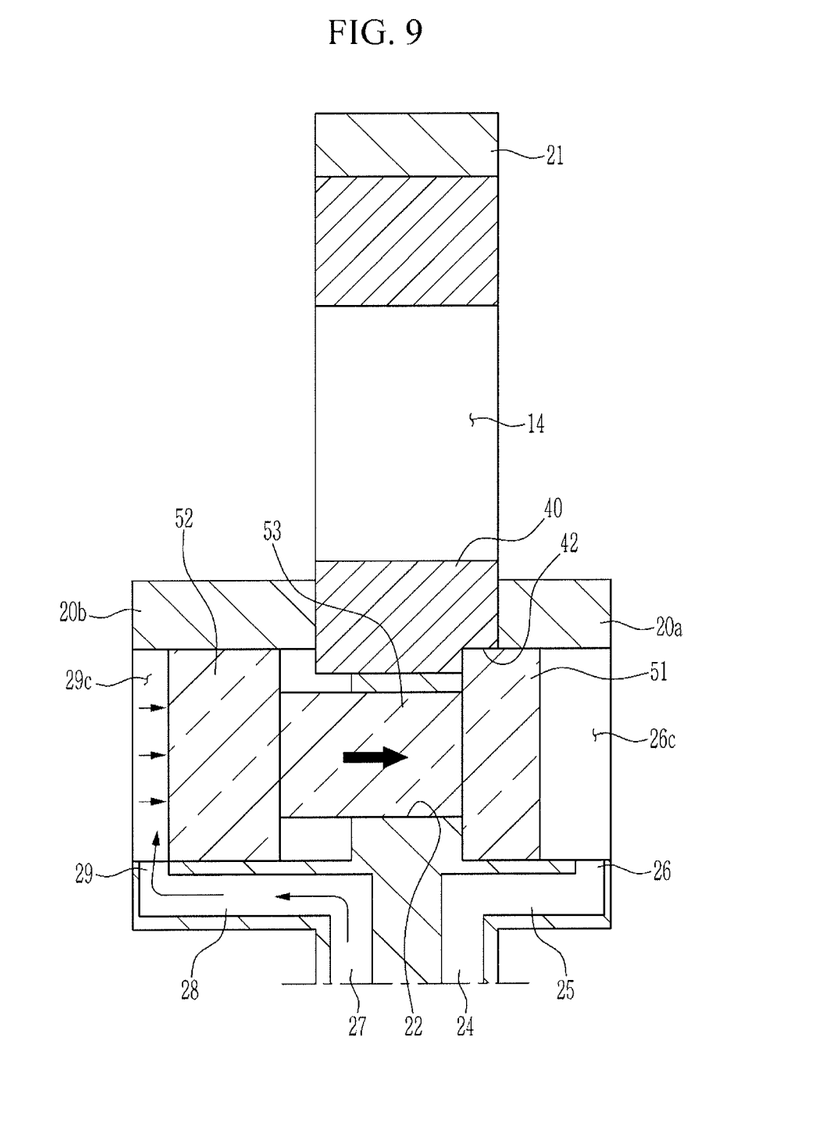

As shown in FIG. 8, in the variable compression ratio apparatus 1 according to an exemplary embodiment of the present invention, a force for moving the latching pin 50 toward the first chamber 26c as hydraulic pressure flowed in the second chamber 29c pushes an external surface of the second land 52, that is, the force of pushing the latching pin 50 toward the first chamber 26c is generated in case that hydraulic pressure sequentially passing through the second oil passage 27, the second horizontal extending passage 28, and the second vertical extending passage 29 is supplied to the second chamber 29c. In a state of maintaining the force, the latching pin 50 is moved such that the second land 52 is inserted into the second latching groove 44 when a second latching groove 44 recessed from the other surface of the eccentric cam 40 is positioned to be corresponded with a portion of the second land 52 depending on the eccentric cam 40 (Referring to FIG. 4). Herein, the second latching groove 44 may be formed in a shape corresponding with parts of the second chamber 29c and the second land 52. For instance, if the second chamber 29c and the second land 52 are formed in a circular shape, the second latching groove 44 is formed in a partial circular shape including a circular arc and the second land 52 is inserted as a partial circle including a circular arc. In this regard, the small end portion 21 is latched to the eccentric cam 40 when the second land 52 is moved to be inserted into the second latching groove 44.

Drawings illustrate that a low compression ratio condition of an engine is achieved as a distance between the piston pin 12 and the crank pin 34 is to be relatively near, that is, the piston 10 is positioned to be relatively low when the latching pin 50 is inserted into the first latching groove 42 such that the small end portion 21 is latched to the eccentric cam 40, and a high compression ratio condition of an engine is achieved as a distance between the piston pin 12 and the crank pin 34 is to be relatively far, that is, the piston 10 is positioned to be relatively high when the latching pin 50 is inserted into the second latching groove 44 such that the small end portion 21 is latched to the eccentric cam 40. Herein, a low compression ratio and a high compression ratio of an engine may be determined depending on the positions of forming the first latching groove 42 and the second latching groove 44 at the eccentric cam 40 (Referring to FIGS. 4 and 10).

As shown in FIG. 7, operation of returning the latching pin 50 into the state that the eccentric cam 40 is not latched to the small end portion 21 is performed as hydraulic pressure is supplied through the second oil passage 27 in the state that the latching pin 50 is inserted into the first latching groove 42 and hydraulic pressure is supplied through the first oil passage 24 in the state that the latching pin 50 is inserted into the second latching groove 44. In other words, the latching pin 50 is moved toward a direction of being returned to an original position thereof when hydraulic pressure being flowed in the second chamber 29c pushes an external surface of the second land 52 in the state that the first land 51 is inserted into the first latching groove 42, and the latching pin 50 is moved toward a direction of being returned to an original position thereof when hydraulic pressure being flowed in the first chamber 26c pushes an external surface of the first land 51 in the state that the second land 52 is inserted into the second latching groove 44.

Figure 10:
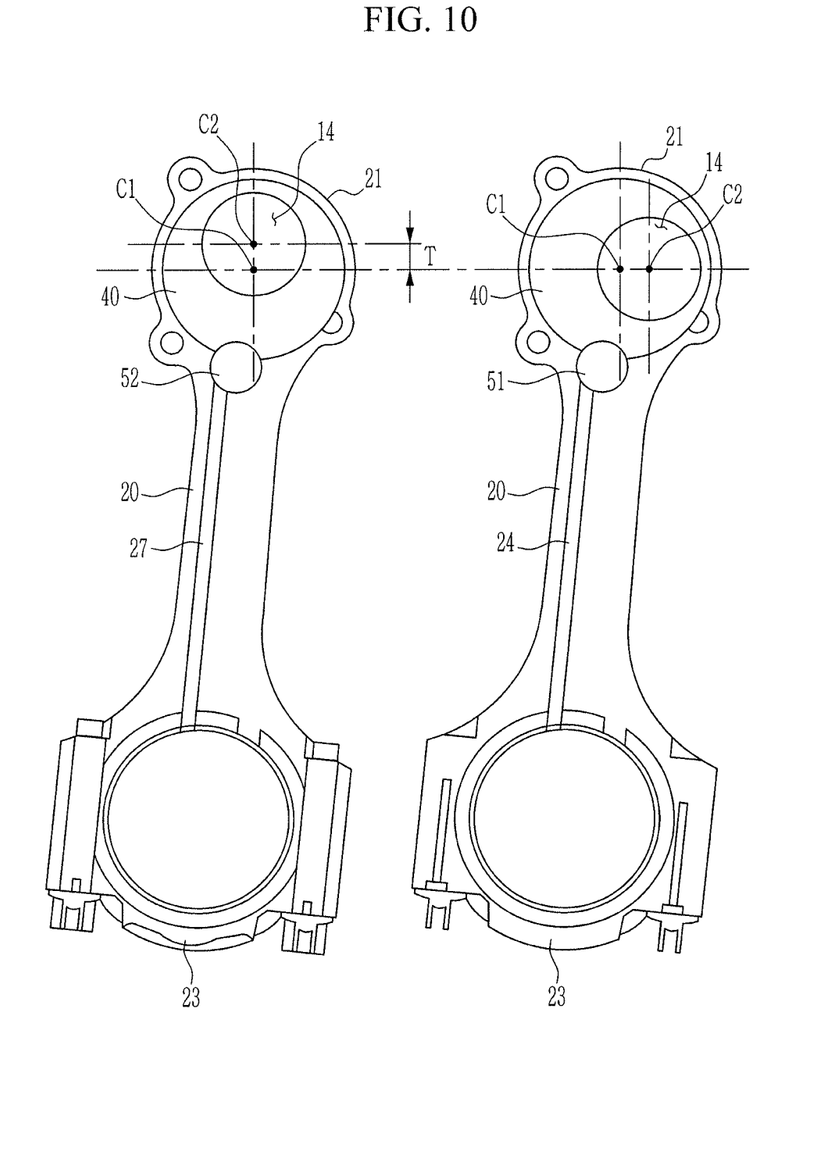
FIG. 10 is a schematic diagram for comparing a position in a low compression ratio with a position in a high compression ratio of a piston according to an exemplary embodiment of the present invention.

FIG. 10 is a schematic diagram for comparing a position in a low compression ratio with a position in a high compression ratio of a piston according to an exemplary embodiment of the present invention.

As shown in FIG. 10, the top dead center of the piston 10 in the condition that an engine is driven by a low compression ratio as the latching pin 50 is inserted into the first latching groove 42 and the top dead center of the piston 10 in the condition that an engine is driven by a high compression ratio as the latching pin 50 is inserted into the second latching groove 44 are different from each other as a predetermined value in FIG. 10, the difference value T between the top dead center of the piston 10 in the condition that an engine is driven by a low compression ratio and the top dead center of the piston 10 in the condition that an engine is driven by a high compression ratio is illustrated as a difference between lines extending from the axial center C2 of the piston pin insertion hole 14 in each conditions. It is illustrated that the first latching groove 42 and the second latching groove 44 are formed with 90 degrees gap in a circumference direction of the eccentric cam 40 in FIGS. 4 and 10, and thus, a circle center C1 of the eccentric cam 40 and the axial center C2 of the piston pin 12 may be disposed in a horizontal direction when the latching pin 50 is inserted into the first latching groove 42 and the circle center C1 of the eccentric cam 40 and the axial center C2 of the piston pin 12 may be disposed in a vertical direction when the latching pin 50 is inserted into the second latching groove 44.

According to an exemplary embodiment of the present invention, manageability of control may be improved as a composition for limiting rotation of the eccentric cam 40 is to be simple. Furthermore, Interference by rotational inertia in latching the eccentric cam 40 may be prevented and cost may be reduced as the latching pin 50 configured to have a simple composition and moved in a direction which is disposed in parallel with the crankshaft 30 is provided. Furthermore, operational reliability may be better as the acting oil passages 24, 25, 26, 27, 28, and 29 for the latching pin 50 are to be simple.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A variable compression ratio (VCR) apparatus which is mounted in an engine rotating a crankshaft upon receiving combustion power of a mixture of air and fuel from a piston and is configured to change a compression ratio of the mixture according to a driving condition of the engine, the VCR apparatus comprising:
   a connecting rod including:
     a small end portion having a circular hole to be rotatably connected to a piston pin moving with the piston; and
     a large end portion rotatably connected to a crank pin eccentrically mounted with respect to the crankshaft;
   an eccentric cam concentrically mounted and rotatably mounted in the circular hole of the small end portion, wherein the piston pin is eccentrically inserted into a piston pin insertion hole of the eccentric cam and is rotatably connected with the eccentric cam;
   a latching pin mounted in the small end portion to make a reciprocal rectilinear motion in a direction of rotation axis of the small end portion and operated to selectively latch the small end portion with the eccentric cam in one among at least two relative positions between the small end portion and the eccentric cam;

an acting oil passage assembly formed at the connecting rod, wherein hydraulic pressure for operating the latching pin is supplied from the large end portion to the latching pin through the acting oil passage assembly;

a first hollow protrusion portion protruded toward an external side from a first side of the connecting rod, wherein a portion of the first hollow protrusion portion is overlapped with a first open surface of the circular hole of the small end portion in which the eccentric cam is inserted and accommodated and, wherein the first hollow protrusion portion includes a hole which is bored in parallel with a direction of rotation axis of the eccentric cam;

a second hollow protrusion portion protruded toward an external side from a second side of the connecting rod, wherein a portion of the second hollow protrusion portion is overlapped with a second open surface of the circular hole of the small end portion in which the eccentric cam is inserted and accommodated and, wherein the second hollow protrusion portion includes a hole which is bored in parallel with the direction of rotation axis of the eccentric cam; and a hollow connecter portion formed at the connecting rod to be mounted at an internal side with respect to the first open surface and the second open surface of the small end portion for fluidically-communicating the hole of the first hollow protrusion portion with the hole of the second hollow protrusion portion, wherein the circular hole of the small end portion is partially overlapped with the hole of the first hollow protrusion portion and the hole of the second hollow protrusion portion.

2. VCR apparatus of claim 1, wherein the acting oil passage assembly includes:

a first oil passage extending from the large end portion to the first hollow protrusion portion in a longitudinal direction of the connecting rod to receive hydraulic pressure supplied through an oil passage connected to the crankshaft;

a first horizontal extending passage extending toward an external side in parallel with a direction of rotation axis of the small end portion from an extended end portion of the first oil passage;

a first vertical extending passage vertically extending with the direction of rotation axis of the small end portion from an extended end portion of the first horizontal extending passage to fluidically-communicate with the hole of the first hollow protrusion portion;

a second oil passage extending from the large end portion to the second hollow protrusion portion in a longitudinal direction of the connecting rod to receive hydraulic pressure supplied through the oil passage connected to the crankshaft;

a second horizontal extending passage extending toward an external side in parallel with the direction of rotation axis of the small end portion from an extended end portion of the second oil passage; and a second vertical extending passage vertically extending with the direction of rotation axis of the small end portion from an extended end portion of the second horizontal extending passage to fluidically-communicate with the hole of the second hollow protrusion portion.

3. The VCR apparatus of claim 2, wherein the latching pin includes:

a first land formed at a first end portion of the latching pin in a direction of making a rectilinear motion and mounted in the hole of the first hollow protrusion portion;

a second land formed at a second end portion of the latching pin in a direction of making a rectilinear motion and mounted in the hole of the second hollow protrusion portion; and a spool shaft connecting the first land and the second land, wherein a cross section of the spool shaft is formed to be smaller than each cross section of the first land and the second land, and, wherein the hole of the first hollow protrusion portion is formed to be longer than the first land in a direction of making the rectilinear motion of the latching pin and to have a size to correspond with the first land in a direction which is vertically mounted with a direction of making the rectilinear motion of the latching pin and is configured to have a first chamber which fluidically-communicates with the first vertical extending passage at an external side with respect to an external surface of the first land, and wherein the hole of the second hollow protrusion portion is formed to be longer than the second land in a direction of making the rectilinear motion of the latching pin and to have a size to correspond with the second land in a direction which is vertically mounted with a direction of making the rectilinear motion of the latching pin and is configured to have a second chamber which fluidically-communicates with the second vertical extending passage at an external side with respect to an external surface of the second land.

4. The VCR apparatus of claim 3, wherein a force for moving the first land toward the eccentric cam is generated as hydraulic pressure flowed in the first chamber pushes an external surface of the first land when hydraulic pressure sequentially passing through the first oil passage, the first horizontal extending passage and the first vertical extending passage is supplied to the first chamber.

5. The VCR apparatus of claim 4, wherein, when a first latching groove recessed from a surface of the eccentric cam is aligned to corresponded with the first chamber depending on a rotation of the eccentric cam in a state of maintaining the force of pushing the first land toward the eccentric cam, the latching pin is moved so that the first land is inserted into the first latching groove.

6. The VCR apparatus of claim 5, wherein a low compression ratio condition of the engine is achieved as a top dead center of the piston is relatively lower than a predetermined value when the first land is inserted into the first latching groove such that the small end portion is latched with the eccentric cam.

7. The VCR apparatus of claim 6, wherein operation of returning the latching pin into a state that the small end portion is not latched to the eccentric cam is performed as hydraulic pressure flowed in the second chamber pushes an external surface of the second land while the first land is inserted into the first latching groove.

8. The VCR apparatus of claim 5,
wherein the first latching groove is formed in a partial circular shape having a circular arc and the first land is inserted as a partial circle having a circular arc.

9. The VCR apparatus of claim 3,
wherein a force for moving the second land toward the eccentric cam is generated as hydraulic pressure flowed in the second chamber pushes an external surface of the second land when hydraulic pressure sequentially passing through the second oil passage, the second horizontal extending passage and the second vertical extending passage is supplied to the second chamber.

10. The VCR apparatus of claim 9,
wherein, when a second latching groove recessed from a surface of the eccentric cam is aligned to corresponded with the second chamber depending on a rotation of the eccentric cam in a state of maintaining the force of pushing the second land toward the eccentric cam, the latching pin is moved so that the second land is inserted into the second latching groove.

11. The VCR apparatus of claim 10,
wherein a high compression ratio condition of the engine is achieved as a top dead center of the piston is relatively higher than a predetermined value when the second land is inserted into the second latching groove so that the small end portion is latched with the eccentric cam.

12. The VCR apparatus of claim 11,
wherein operation of returning the latching pin into a state that the small end portion is not latched to the eccentric cam is performed as hydraulic pressure flowed in the first chamber pushes an external surface of the first land while the second land is inserted into the second latching groove.

13. The VCR apparatus of claim 10,
wherein the second latching groove is formed in a partial circular shape having a circular arc and the second land is inserted as a partial circle having a circular arc.

* * * * *